United States Patent [19]

Nunley et al.

[11] Patent Number: 4,791,672

[45] Date of Patent: Dec. 13, 1988

[54] WEARABLE DIGITAL HEARING AID AND METHOD FOR IMPROVING HEARING ABILITY

[75] Inventors: James A. Nunley, Phoenix, Ariz.; John W. Steadman; Perry J. Wechsler, both of Laramie, Wyo.

[73] Assignee: Audiotone, Inc., Phoenix, Ariz.

[21] Appl. No.: 658,117

[22] Filed: Oct. 5, 1984

[51] Int. Cl.$^4$ .......................... H04R 25/02; H04R 3/04; G05B 19/00; H04B 15/00

[52] U.S. Cl. .......................... 381/68.2; 364/178; 364/572; 381/68; 381/74

[58] Field of Search .......................... 381/68, 68.2, 68.4, 381/23.1, 94, 111, 120, 122; 364/148, 178, 572

[56] References Cited

U.S. PATENT DOCUMENTS

| | | | |
|---|---|---|---|
| 3,490,691 | 1/1970 | Uyetani et al. | 364/178 |
| 4,093,988 | 6/1978 | Scott | 364/572 |
| 4,322,579 | 3/1982 | Kleis et al. | 381/120 |
| 4,368,509 | 1/1983 | Li | 364/178 |
| 4,405,831 | 9/1983 | Michelson | 381/68.4 |
| 4,409,435 | 10/1983 | Ono | 381/68.2 |
| 4,425,481 | 1/1984 | Mansgold et al. | 381/68 |
| 4,441,202 | 4/1984 | Tong et al. | 381/68 |
| 4,454,609 | 6/1984 | Kates | 381/68 |
| 4,508,940 | 4/1985 | Steeger | 381/68.2 |
| 4,622,440 | 11/1986 | Slavin | 381/68 |
| 4,628,529 | 12/1986 | Borth et al. | 381/68.2 |
| 4,630,302 | 12/1986 | Kryter | 381/68.4 |

OTHER PUBLICATIONS

"A Wearable Digital Hearing Aid", James Nunley et al., The Hearing Journal, Oct. 1983, (copy enclosed).

*Primary Examiner*—Jin F. Ng
*Assistant Examiner*—Danita R. Byrd
*Attorney, Agent, or Firm*—Edward J. DaRin

[57] ABSTRACT

A hearing aid to be worn by an individual of impaired hearing ability producing analog output signals of improved intelligibility. The hearing aid includes a wearable, programmable digital signal processor for processing digital samples of the analog signals coupled thereto in real time and providing analog output signals having the processed characteristics. The hearing aid program stored in the signal processor is continuously executed and modifies the analog signals coupled thereto by digital filtering in real time in accordance with the varying noise levels contained in the received audible signals. The modification of the signals includes noise supression.

22 Claims, 2 Drawing Sheets

WEARABLE DIGITAL HEARING AID AND METHOD FOR IMPROVING HEARING ABILITY

FIELD OF INVENTION

This invention relates to electronic hearing aids and more particularly, to a wearable, digital hearing aid having a programmable digital signal processor for processing the hearing aid signals in real time and methods for improving the hearing ability of an individual having impaired hearing through the use of a wearable, ditigal hearing aid.

BACKGROUND OF THE INVENTION

Electronic hearing aids of various types for use by hearing impaired individuals are well known in the art. In the development of electronic hearing aids various techniques have been developed to process hearing aid signals to improve the hearing aid's ability to overcome the hearing impaired individual's hearing problem. These signal processing techniques include the use of the mechanical insert filters, active and passive filters, venting, binaural fittings, directionality, and a variety of automatic gain control circuits. In addition, other attempts have been made to improve hearing aid performance by precise, individualized adjustment of compression ratios, frequency bandwidth, output-limiting levels, and functional frequency gain levels. As contrasted with the aforementioned signal processing techniques, digital signal processing is directed to changing the audio signal in some manner to increase the ability of an individual with impaired hearing ability, to hear. In a hearing aid, signal processing implies the real time processing of a digital signal to changed the signal in some manner to render it easier to hear. Signal processing in the sense of data processing implies the manipulation of digital data, which may or may not represent an occurring event, but in general does not modify any communication signal in real time. Digital signal processing for a hearing aid has been attempted in the past by the use of a high speed microprocessor. These prior art hearing aids, however, require a multiplicity of peripheral devices for the proper operation of the hearing aid system. These peripheral devices include memory devices, input/output devices, analog to digital converters, digital to analog converters, etc., so that the complete hearing aid system is too large and requires too much current for practical use as a body-worn hearing aid. It is also recognized that the software algorithms of digital signal processing have been available for more than twenty years, but has not resulted in a digital signal processor capable of processing hearing aid data in real time for use as a practical, wearable, hearing aid. The prior digital signal processors required the audio signals to be processed to be first stored for the purposes of processing. The processing of such stored data required hours, or even days, for processlng, thus rendering the techniques impractical for a wearable hearing aid. To our knowledg, digital signal processing in real time in a body-worn hearing aid utilizing a high speed digital signal processor has not been commercially available, and/or accomplished heretofore.

SUMMARY OF THE INVENTION

The present invention provides an improved hearing aid incorporating a very high speed digital signal processor, such as a microprocessor, therein permitting the maximization of the clarity, or intelligibility of speech by improving the signal-to-noise ratios in real time of the audible signal that results in a wearable hearing aid. The digital hearing aid of the present invention adapts to changing signals and performs noise suppression in real time. The digital signal processor permits digital filtering of the discrete digital samples of the continuous analog data representative of the continuous audio signals heard for improving the signal-to-noise ratios of the audio signals coupled to the individual's ear canal. The digital signal processor, in the form of a microprocessor, is provided with a preselected program stored therein that is continuously executed for continuously processing each discrete digital sample before the arrival of a subsequent digital sample. The hearing aid can be "personalized" by simply changing the program stored in the processor's memory to change the hearing aid response without altering the hardware.

From the method standpoint, the invention comprehends a method of improving the signal-to-noise ratios of audibile sounds in real time, including the steps of receiving audible signals at or adjacent the human ear of an individual with impaired hearing ability, and converting the audible signals to corresponding analog signals. The analog signals are filtered to limit the frequency band thereof to a preselected frequency band for preventing aliasing in any digital filtering of the resulting filtered signals and then continuously converting the filtered analog signals to digital signals occuring at a preselected rate; continuously deriving analog signals from the filtered analog signals representative of the noise level content of the received. audible signals. The noise level signal is continuously monitored to determine an appropriate digital filter to improve the signal-to-noise ratios thereof. The steps include continuously providing a plurality of second order digital filters for filtering the digital signals in real time. The digital filters each provide different filtering capabilities ranging from no filtering to a high pass filter with a roll off below a preselected noise level frequency and some enhancement of frequencies above a preselected frequency for continuously improving the signal-to-noise ratios of the received signals. The digital signals are continuously and automatically directed to one of the digital filters in accordance with the result of the comparisons of the noise level signals and then continuously converting the modified digital signals from the digital filters to corresponding analog signals followed by continuous conversion of the resulting analog signals to audible signals, and which signals are coupled into the ear of the individual to thereby increase the individual's hearing capability.

From a structural standpoint, the present invention comprehends a hearing aid adapted to be worn by an individual of impaired hearing ability. The hearing aid comprises hearing aid microphone means for receiving audio signals, including speech signals, and continuously converting the signals to corresponding electrical analog signals. Low pass filtering circuit means is coupled to receive the analog signals from the microphone means for transmitting only those analog signals necessary for good fidelity and intelligibility of the audio signals and rejecting the signals of a higher frequency. Circuit means are coupled to receive the signals from the filtering circuit means for continuously deriving analog signals representative of the noise levels present in the received audio signals. A wearable, programmable digital signal processing means having a memory and a plurality of signal input terminals and a signal output terminal capable of digitally processing the analog signals coupled thereto in real time and providing analog output signals therefrom. Means are provided for continuously coupling the signals from the low pass filtering circuit means to a first input terminal for the digital signal processing means along with means for continuously coupling the signals representative of the noise levels to a second input terminal for the digital signal processing means. The digital signal processing means having stored in the memory thereof a hearing aid program for continuous excution to operate on the analog signals coupled to the input terminals thereof. The hearing aid program is defined to continously generate a plurality of digital filters for processing digital samples of the signals coupled to the first input terminal for said signal processing means to selectively modify the signals, including suppressing the noise therein in accordance with the changes in noise levels. The program is further defined to continuously monitor the signals coupled to the first and second input terminals for the signal processing means and signalling the selection of one of the digital filters for processing the signals coupled to said first input terminal based on the results of the measurements. The program provides continuous analog-to-digital signal conversion of the signals coupled to the first input terminal at a preselected sampling rate to permit each digital sample to be digitally filtered by the selected one of the digital filters in a time interval to completely process each digital sample before the subsequent digital sample occurs. The signal processing means is programmed to convert the digital samples to corresponding analog output signals appearing at the output terminal of the processor. Circuit means are provided for coupling the output terminal of the signal processing means to a smoothing filter circuit for accurately reproducing the analog output signals in the form of intelligible speech signals with hearing aid speaker means being coupled to the latter mentioned circuit means for continuously converting the coupled signals to the corresponding audio signals having the improved characteristics in accordance with the executions of the stored hearing aid program.

BRIEF DESCRIPTION OF THE DRAWINGS

These and other features of the present invention may be more fully appreciated when considered in the light of the following specification and drawings, in which.

DETAILED DESCRIPTION OF THE PREFERRED EMBODIMENT

Figure 1:
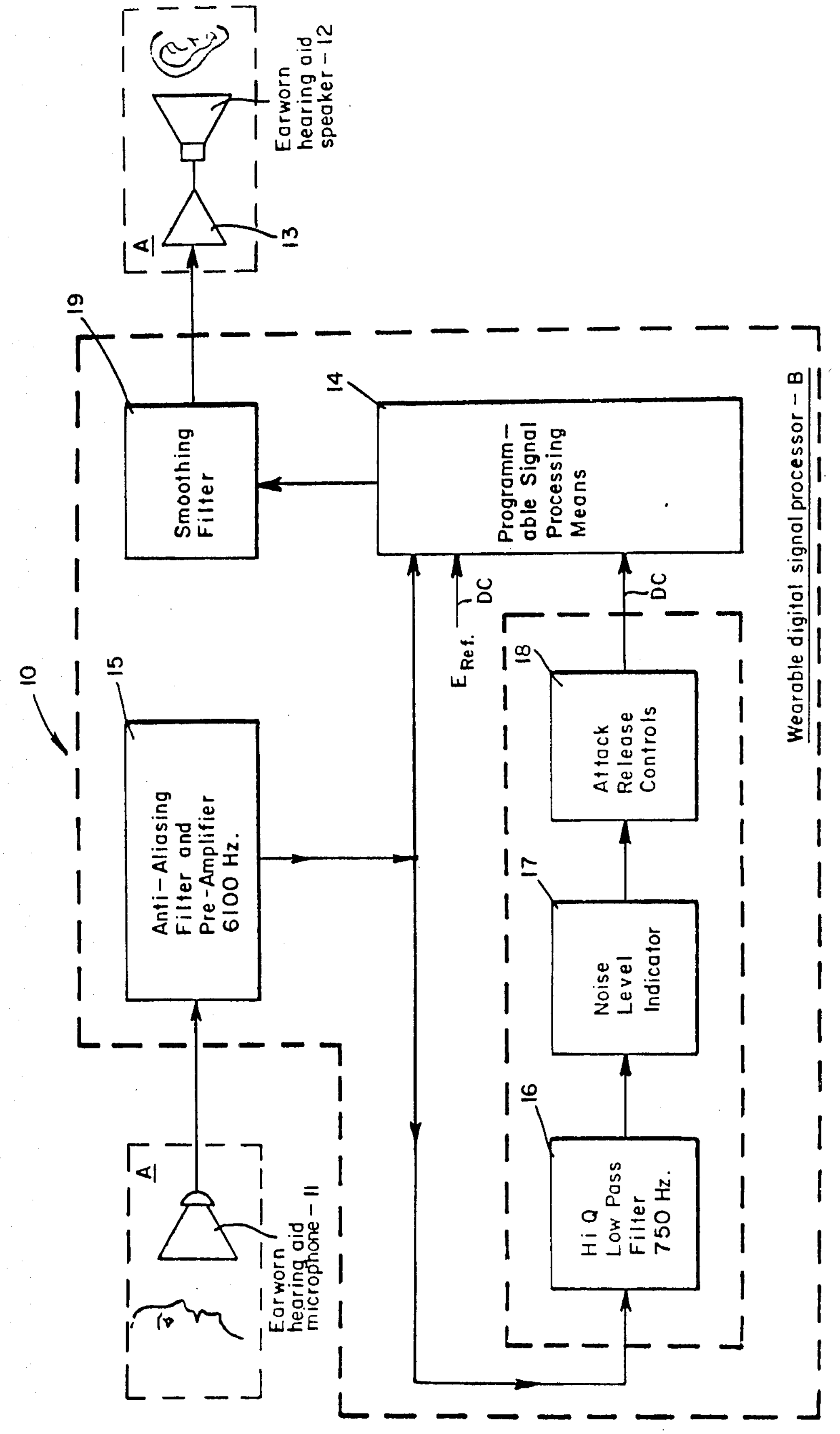
FIG. 1 is a block diagram of a wearable, digital hearing aid embodying the present invention.

For the purposes of the present invention, certain terms, as utilized in the computer art, are defined herein, since they have meaning for the purposes of the present invention as these terms are applied to a hearing aid of the present invention. The definitions, as applied to these terms, are as follows:

ANALOG—Refers to data in the form of continuously changing physical quantities; waves or devices that operate on an analog signal.

DIGITAL—Refers to data in the form of discrete units, such as "ON/OFF", or, "HIGH/LOW" states, and to devices operating on such data.

DIGITIZE—To place data into digital form for use in a digital computer.

DIGITAL COMPUTER—A programmable, electronic device that can store, retrieve, and process digital data.

DIGITAL SIGNAL PROCESSING—Generally means the creation, changing or detection of signals using digital implementation.

MICROPROCESSOR—Large scale integration (LSI) of a complete digital processor (arithmetic logic control unit of a computer) on a single chip.

PROGRAM—Sequence of instructions that result when executed in a step by step fashion in the solution of a problem.

REAL TIME—Processing that operates on all previous data and results in an output before the next input sample is required, so that there is little time delay.

ALIASING—The introduction of error in the Fourier analysis of a discrete sampling of continuous data when components with frequencies too great to be analyzed with the sampling interval being used contribute to the amplitudes of lower frequency components.

Now referring to the drawings, the wearable digital hearing aid 10 of the present invention will be described in detail. Basically, the wearable digital hearing aid 10 is physically packaged in two units to be worn by an individual with impaired hearing ability. One of the units is a conventional hearing aid A, which may be of the behind the ear type, with the second unit being a wearable digital signal processor B and the power source therefor that is carried on the body of the hearing impaired individual such as in a pocket, or the like. The conventional hearing aid A comprises a hearing aid microphone 11 for receiving the audible sound signals including speech for conversion to corresponding analog signals. The hearing aid A also packages the speaker 12 for the hearing aid, along with an amplifier 13. The speaker 12 is arranged to couple the audible sound signals that have been processed by the digital signal processor B into the ear of the hearing aid wearer. The wearable digital signal processor unit B, in accordance with the present invention, receives the analog signals from the hearing aid microphone 11 and conditions them for processing in the programmable signal processing means 14. The analog signals received at the input of the signal processing means 14 are digitally processed and provided corresponding output signals from the signal processing means 14 and which output signals are further conditioned for coupling to the hearing aid speaker 12.

Analog circuits are utilized for conditioning the signals received from the microphone 11 and which circuits include an anti-aliasing filter and preamplifier 15, illustrated in FIG. 1 in block form. The analog signals received from the microphone 11 are coupled to the antialiasing filter circuit 15 wherein the filtering means is constructed and defined to cut off received signals having a preselected audio frequency above approximately 6100 Hertz, while continuously transmitting all the analog signals therethrough below the selected high audio high frequncy and then amplifying the filtered output signals. The filtering provided by the circuit 15 is to eliminate any possible error in the Fourier analysis of the digital samples when signal components with frequencies too great to be analyzed within the sampling interval utilized in the processor 14 contribute to the amplitudes of lower frequency components. The output signals from the anti-aliasing filter and preamp 15 is coupled directly to an input terminal for the programmable signal processing means 14. The output of the anti-aliasing filter and preamp 15 is also coupled to a circuit for deriving a noise level signal representative of the noise level in the audible signal received at the microphone 11. This noise level signal generator comprises a low pass filter circuit means 16 which receives the analog signals from the output of the anti-aliasing filter and preamp 15. The low pass filter circuit 16 constructed and defined to transmit all the analog signals coupled thereto below a preselected low frequency and to attenuate all of the signals above the low frequency. The low frequency selected for the particular embodiment under construction is 750 Hertz. The frequencies below 750 Hertz are defined for the purposes of the present invention as "noise" as it is. within this frequency range that most of the noise in the audible signals occurs. The filtered signals from the filtering circuit 16 are applied to a noise level indicator 17. The noise level indicator 17 converts the "noise level" of the signals from the filtering circuit 16 to direct current voltage levels representative of the noise level. The Attack/Release controls 18 receive the DC signals from the noise level indicator 17 and affect the rise/fall times of the direct current voltages prior to coupling them to an individual input terminal of the programmable signal processing means 14. The signal processing means 14 is also provided with a reference DC voltage level whihc functions as a reference for the analog-to-digital converters. In the above circuit arrangement the analog signals corresponding to the audible signals received at the microphone 11 are continuously coupled to the programmable signal processing means 14. The programmable signal processing means 14 has a hearing aid program stored therein that is continuously executed by the processor, including converting the analog signals representative of the received audio signals to digital increments thereof and the discrete digital signals are digitally filtered by adding and subtracting weighted versions of past and present inputs and outputs to emphasize or de-emphasize various aspects of the signals in real time. Basically, the digital processor 14 improves the signal-to-noise ratios of the received signals with the changing noise levels detected by selecting an individual digital filter based on the comparisons of the noise signals. The frequency pattern is also changed by increasing the high frequencies and reducing the low frequencies of the received signals to maximize the clarity or intelligibility of speech in real time. The signal processing means provides filtered analog output signals that are applied to the smoothing filter circuit 19 for smoothing out the effects of the digital filters on the signals for accurately reproducing intelligible speech signals. The output signals from the smoothing filter circuit 19 are coupled to the amplifier 13 in the ear worn hearing aid housing A. The amplified signals are then applied to the speaker 12 for reproducing the audio signals of improved clarity, or intelligibility of speech in real time. The coupling between the ear worn hearing aid A and the wearable digital signal processor B may be by means of a conventional cable, or by a radio frequency link between units A and B when it is not desired to have a cable running from the ear to the body of the hearing impaired individual.

Now referring to FIG. 2, a detailed description of the circuits housed within the wearable signal processor B will be described. The signal from the microphone 11 housed in the unit A is coupled directly into the anti-aliasing filter portion of the circuit 15 by means of a coupling capacitor C1 connected to the output of the microphone 11 and the input to the filtering circuit 15. The anti-aliasing filter 15 is constructed as a two pole, analog low pass filter for cutting off signals having a frequency greater than 6100 Hertz for the purposes of the present invention. Basically, the filter 15 filters out any high frequency signal of any frequency greater than some value approximately half the digital sampling rate in the processor 14. The filtering is accomplished by the pair of series arranged input resistors R2 and R3 and the parallel capacitors C2 and C3. The coupling capacitor C1 and the input filtering resistors R2 and R3 are connected in series circuit relationship to the positive input terminal of an operational amplifier 20. The filtering capacitor C2 has one terminal coupled between the common junction between the resistors R2 and R3, while the filtering capacitor C3 is connected to the positive input terminal of the operational amllifier 20. The resistor R1 is provided as a biasing resistor for the operational amplifier 20 and is coupled between ground and a common point between the coupling capacitor C1 and the filtering resistor R2. The filtering capacitor C3 has its remaining terminal connected directly to ground potential. The negative terminal of the operational amplifier 20 is connected to a biasing resistor R4 which hss its remaining terminal connected in common with the remaining terminal of the filtering capacitor C2 to the junction of a pair of voltage gain, series arranged resistors R5 and R6. One terminal of the gain resistor R5 is connected directly to the output terminal of the operational amplifier 20, and the remaining terminal of the gain resistor R6 is connected directly to ground. The operational amplifier 20 in a practical embodiment is one-fourth of a commercially available quad operational amplifier and is further identified in FIG. 2 and ¼ U-2. The circuit described in conjunction with the operational amplifier functions as a pre-amplifier for the signals from the filtering network and are amplified by a factor dependent on the ratio of the resistance values of R5 to R6 and are defined to amplify by a factor of 10. The filtered and amplified signals from the anti-aliasing element 15 are applied directly to one of the input terminals for the programmable signal processing means 14.

Figure 2:
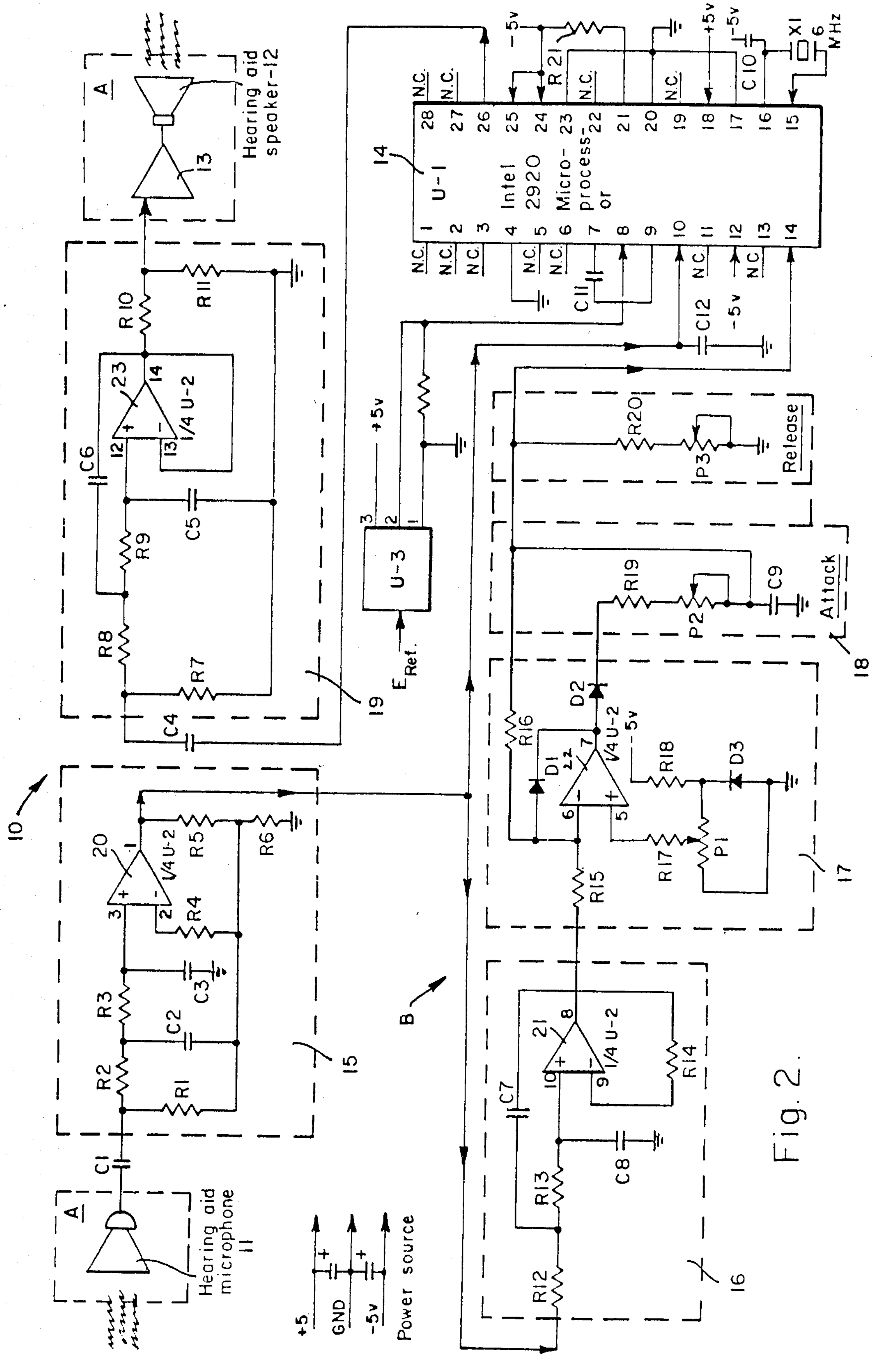
FIG. 2 is a block-schematic circuit diagram of the wearable digital hearing aid of FIG. 1.

The programmable signal processing means 14, as illustrated in FIG. 2, is a commercially available microprocessor identified as the Intel 2920 Microprocessor, manufactured by the Intel Corporation of Santa Clara, Calif. As illustrated in FIG. 2, the analog output signals from the anti-aliasing filter element 15 are coupled directly as input signals to the input terminal 10 for the microprocessor 14. For the purposes of generating the signals representative of the noise levels in the audible signals received at the microphone 11, the filtered analog signals from the filter 15 are also applied to the noise level generating circuits and for this purpose are coupled directly into the low pass filter circuit 16. For the purposes of the present invention "noise" is defined as the energy below a preselected low frequency level that has been selected to be the signals falling within the band of zero to 750 Hertz as that is where most of the noise energy occurs. The sounds which render words distinguishable from each other in speech occur at higher frequencies. Accordingly, the low pass filter circuits 16 are constructed and defined to receive the analog signals from the circuit 15 and to transmit all the signals below the 750 Hertz level and to attenuate all the signals above the 750 Hertz level. The signals from the filtering circuit 15 are coupled directly to one input terminal of the operational amplifier 21, or the positive input terminal, which is provided with a pair of series arranged filtering resistors R12 and R13. The input analog signals are coupled to one end of the filtering resistor R12 and resistor R12 has its other end connected in common to an end of the filtering resistor R13. R13. The remaining end for the resistor R13 is connected directly to the positive input terminal for the operational amplifier 21. Filtering capacitors C7 and C8 also comprise the low pass filter 16. The capacitor C7 is connected between the output terminal of the amplifier 21 and the common junction between the filtering resistors R12 and R13. The filtering capacitor C8 is coupled to the positive input terminal of the operational amplifier 21 and ground. A feedback resistor R14 completes the circuit and is connected between the negative terminal of the operational amplifier 21 and the output terminal. The operational amplifer 21 in a practical embodiment is also defined by one-fourth of a quad operational ampiifier and is further identified as ¼ U−2. The resulting filtered signals from the filter 16 are then coupled directly to the noise level indicator 17, which provides the DC signals representative of the noise levels present in the received audible signals.

The noise level indicator circuit 17 comprises an operational amplifier 22 which is coupled through an input resistor R15 directly to the output terminal of the amplifier 21 and to hhe negative input terminal of the operational amplifier 22. The operational amplifier 22, as in the prior embodiments of the operational amplifiers, consists of one-fourth of a quad operational amplifier and is further identified as ¼ U−2. The positive terminal of the operational amplifier 22 is connected to an offset adjustment control for varying the "No Signal Present" DC voltage level outputs from the circuit 17. This effectively selects the noise level at which the microprocessor 14 will start adapting. This offset adjustment consists of the offset adjustment resistor R17, having one terminal connected to the positive input terminal of the operational amplifier 22, and to the moveable arm of the offset adjusting potentiometer P1. One terminal of the potentiometer P1 is connected directly to ground potential, while the other terminal is connected to a negative five voltage source through the offset adjusting resistor R18. An offset biasing diode D3 is coupled between ground potential and to one terminal of the potentiometer P1 and also in series with one terminal of resistor R18. As illustrated, the diode D3 has its anode electrode coupled to ground and its cathode electrode coupled to one of the terminals for the potentiometer P1, the right hand end terminal illustrated in FIG. 2. The output terminal for the operational amplifier 22 is connected to a rectifying diode D2 for providing the DC voltage level signals from the operational amplifier 22. The anode electrode for the diode D2 is coupled to the output terminal of amplifier 22. A further rectifying diode D1 is coupled between the negative input terminal of the amplifier 22 and its output terminal. The anode electrode for the diode D1 is connected to the negative input terminal of the amplifier 22 with its cathode electrode connected to the amplifier's output terminal. An average level gain resistor R16 is also coupled between the negative input terminal of the operational amplifier 22 and into the Attack/Release controls 18, as will be described hereinafter. The element 18 receves the DC voltage level signals from the noise level indicator 17 for further conditioning prior to being coupled as input signals to the microprocessor 14. The element 18 comprsses an attack circuit means followed by a release control circuit means. The attack circuit means of the Attack/Release controls 18 receives the direct current output signals of the noise level indicator 17 from the cathode electrodes of the diode D2 by means of a series arranged attack time adjusting resistor R19, which has its other terminal connected in series circuit relationship with one terminal of a variable potentiometer P2 for adjusting the attack time interval. The variable arm of the potentiometer P2 is connected to its remaining terminal in common with one terminal of a capacitor C9, which has its opposite terminal connected directly to ground. The common junction between the potentiometer P2 and the capacitor C9 is connected to the remaining terminal of the average level gain resistor R16 connected back into the noise level indicator circuit 17, as illustrated. The DC voltage signals from the noise level indicator 17 is stored on the capacitor C9. The resistors R19 and the potentiometer P2 are proportioned to control the time interval that the capacitor C9 will charge to a higher value of DC voltage when the noise levels in the audible signal represented by the DC voltages coupled from the indicator circuit 17 increases. The release portion of the circuit 18 is utilized to control the time interval that the voltage on the capacitor C9 is maintained or stored on the capacitor after the particularly loud noise is stopped. This is considered in accordance with the present invention as the controlled release time of the noise level signals. The release time, or the discharge time of capacitor C9 is controlled by providing the shorting resistors R20 and the variable potentiometer P3. The values of the resistor R20 and hhe setting of the moveable arm for the potentiometer P3 control the time interval for discharging the charge on the capacitor C9 to ground. For this purpose the resistor R20 is coupled to one terminal of the capacitor C9 and to one terminal of the potentiometer P3. The moveable arm of the potentiometer P3 is connected directly to ground. The output signals for the release portion of the controls 18 is coupled directly to the No. 14 input terminal for the microprocessor 14. The signal is derived from the common junction of the capacitor C9 and resistor 20.

The microprocessor 14 is also provided with a DC voltage level that is considered to be the referenced voltage for the analog-to-digital converter. In a practical embodiment of the invention, the reference voltage signal is provided by a commercially available voltage regulator U-3 having three pins, reading from left to right as illustrated. The No. 1 pin is connected directly to ground, while the No. 2 pin is connected to ground by means of a dropping resistor, with the third pin connected to the plus 5 voltage source. The DC voltage level derived from the voltage regulator U3 is at 1.2 Volt level and is derived from pin 2 and is coupled directly to the No. 8 input terminal for the micrprocessor 14.

As is conventional, the terminals for the microprocessor 14, which are identified as terminals 1 through 28, and which are identified as "N.C." are not utilized, or not connected. The terminals numbered 4, 17, 20 and 23 are connected directly to ground. The No. 7 and 9 terminals are coupled together by means of a sampling capacitor C11. The No. 10 terminal receives the analog input sinnals to be processed and is also connected to a sample and hold capacitor C12. The No. 12 terminal is connected directly to the negative 5 voltage source.

Terminals 18, 24 and 25 are connected directly to the plus 5 voltage source. The terminals 15 and 16 are connected to a precision cyrstal providing 6 Megahertz signals therefrom. The two terminals of the crystal are connected to the terminals 15 and 16 of the microprocessor 14 with the terminal 16 further coupled by means of the capacitor C10 to the negative 5 voltage terminal. The oscillator circuit is effective for generating the necessary digital clock rate within the microprocessor 14 which controls the digital sampling time intervals or the duration of each digital signal within the microprocessor. The output terminal terminal from the microprocessor 14 is identified as terminal 26.

The power source for the microprocessor 14 may be a battery providing +5 and −5 volts along with a ground terminal, as is schematically illustrated. The power source is packaged in unit B.

Signal processing means 14 in the form of the Intel 2920 microprocessor conventionally includes a memory for storing a hearing aid computer program to be executed in real time. The computer program for the hearing aid 10 is designed so that it is continuously executed by the microprocessor 14 to provide analog output signals corresponding to the digitally processed input signals so that the audio signals received at the microphone 11 that are reproduced at the speaker 12 have the desired characteristics of improved clarity or intelligibility for the sounds received at the microphone and coupled into the ear of the hearing aid wearer. The analog signals received at input terminal No. 10 for the microprocessor 14 are continuously converted to a corresponding multiplicity of digital signals at a preselected sampling or repetition pulse rate. The sampling interval is the duration time of a digital signal that represents a discrete portion of the analog signal that has been converted. All of the digital signals correspond to the complete analog input signals. Each digital signal, in accordance with the present invention, is completely processed and reconverted to a corresponding analog signal when outputted from the microprocessor 14. The stored hearing aid program for the microprocessor 14 also includes the necessary instructions for receiving the noise level signals at the input terminal 14 for determining the manner in which the received digital samples will be processed. The digital signals are mathematically manipulated within the microprocessor 14 according to the programmed instructions to produce the desired modified output signals having the desired characteristics. The hearing aid stored program is defined to continuously generate a plurality of second order digital filters for processing the digital samples in a selected one of the filters in accordane with the comparison of noise level signals coupled to the microprocessor 14. The digital signals are operated on by adding and subtracting weighted versions of past and present inputs and outputs to emphasize or de-emphasize various aspects of the signal. By adjustment of these weighting factors the action of the hearing aid may be "personalized" to its individual wearer. Each digital signal is operated on by the microprocessor 14 in real time. In accordance with the present invention the microprocessor is programmed to continuously provide eight second order digital filters for operating on the digital signals corresponding to the received analog signals. The filters vary from no filtering to a high pass filter with a roll off below 750 Hertz and some enhancement of the frequencies above 1,000 Hertz. The particular filter utilized for an individual digital signal is selected by the microprocessor 14 continuously and automatically by continuously monitoring the noise level signals coupled to input terminal 14. The results of this measurement is that the microprocessor 14 selects an individual digital filter to be utilized and the selected digital filter is changed in accordance with the changes in the noise levels present in the received audible signals. The digital filters defined by the hearing aid program are defined to improve the signal-to-noise ratios of the received signals so that as the noise level increases the noise level is suppressed by causing the lower frequencies to be decreased in amplitude along with increasing the amplitudes of the higher frequencies. This suppression of the noise level is a characteristic of the hearing aid amplifier 10 as distinguished from prior art hearing aids in that the modification of the shape of the amplified signal to eliminate or suppress the noise has not been possible heretofore, as in conventional hearing aid amplifying circuits the noise signals are amplified along with the intelligible, or speech signals so that it may be very difficult, if not impossible, for the hearing aid wearer to hear despite the use of a hearing aid. Each digital signal, then, that is processed through a digital filter, is outputted at the output terminal 26 as a corresponding analog signal and will evidence the effects of the digital processing.

In order to accurately reproduce the intelligible speech signals from the analog signals derived from the microprocessor 14, the smoothing circuit 19 is provided to smooth out the effects of the digital processing thereof. The signal, then, from the output terminal 26 of the microprocessor 14, is coupled to the smoothing filter circuit 17 by means of the coupling capacitor C4 for coupling the analog signals to the positive input terminal of the operational amplifier 23 within the smoothing filter circuit 17. The smoothing filtering action for the element 17 is accomplished by smoothing filter resistors R8 and R9, which are coupled in series circuit relationship between the coupling capacitor C4 and the positive input terminal of the operational amplifier 23. The one terminal of the smoothing filter resistor R8 is coupled directly to the coupling capacitor C4, with the other terminal connected in common with a terminal of the smoothing filter resistor R9, which has its remaining terminal connected directly to the positive input terminal of the operational amplifier 23. Operational amplifier 23, as in the previous embodiments, is one-fourth of a quad operational amplifier and is further identified as $\frac{1}{4}U-2$. The smoothing filtering action is also provided by the capacitors C5 and C6. The capacitor C5 is connected with one terminal connected directly to the positive input terminal of the operational amplifier 23 and the remaining terminal to ground. The smoothing capacitor C6 is coupled between the output terminal of the operational amplifier 23 and the common junction between the resistors R8 and R9. The negative input terminal of the operational amplifier 23 is connected directly to the output terminal. The output terminal is also connected with a series gain reduction output resistor R10 coupling the analog output signal to the amplifier 13 in unit A. The output resistor 10 is also connected to the gain reduction resistor R11, connected to the output terminal of the resistor R10 and ground. The signal from the operational amplifier 23 is coupled directly to the amplifier 13 driving the hearing aid's speaker 12 for reproducing the desired processed audio signals to the ear of the individual wearing the hearing aid 10.

Various programs can be loaded into the memory for the microprocessor 14 to perform modifications to the received signals in real time based on the analysis of the signal in conjunction with the programmed instructions. The hearing aid programs that may be loaded into the memory of the signal processing means 14 may include a program (1) for changing the compressron ratio over frequency based on the amplitude analysis of the low frequency, or noise, region of the received audio signals; (2) changing the compression ratios over frequency based on the amplitude analysis of the high frequency region of the received signal; (3) change the compression ratios over frequency based on the amplitude and ratio analysis of one frequency region to another frequency region in the overall signal; (4) alter the time domain of the signal; (5) enhancing certain signal characteristiss, reduce or remove other signal based on a real time analysis and comparison of the input signal to some programmed pattern; (6) enhance certain signals, reduce or remove other signal based on real time analysis, and comparison of the output signal to current and past input signals; (7) enhance certain signal, reduce or remove other signal based on real time analysis and comparison of the output signal with particular reference to the rate of change of magnitude of a specific frequency.

The computer program that was stored in the microprocessor 14 to achieve the real time processing of the audio signals received at the hearing aid A was defined to repeatedly compute a difference equation of the form:

$$UK=A0*YK+A1*YK1+A2*YK2+B1*UK1+B2*UK2$$

wherein UKx represents the output x time samples in the past; YKx reprensents the input x time samples in the past; the Ax coefficients determine the zero locations and are modified adaptively based on the average level of noise present; the Bx coefficients determine the pole locations.

In a practical embodiment of the circuit illustrated in FIG. 2, the commercially available circuit components and the values of the parameters for the resistors and capacitors and other commerical identification are listed hereinbelow, as follows:

| DESIGNATION | DESCRIPTION | NOTES |
|---|---|---|
| U-1 | Intel 2920 Signal Processor | 1981,1982,1983 Stepping |
| U-2 | LM324 Quad Op-Amp | Power +5 Pin 4; −5 Pin 11 |
| U-3 | LM317 Voltage Regulator | |
| R1 | 100K -OP-Amp Biasing | |
| R2,R3 | 8.2K Ohms; Anti-Biasing | fo = 6100 Hz. |
| R4 | 100K Ohms; Op-Amp Biasing | |
| R5 | 560K Ohms - Gain Resistor | |
| R6 | 10K Ohms - Gain Resistor | |
| R7 | 100K Ohms - Biasing | |
| R8,R9 | 8.2K Ohms - Smoothing Filter | fo = 4.5 KHz |
| R10 | 100K Ohms - Gain Reduction | |
| R11 | 1K Ohms - Gain Reduction | |
| R12, R13 | 220K Ohms - Low Pass to Average Level | fo = 720 Hz |
| R14 | 100K Ohms - Biasing | |
| R15 | 100K Ohms - Average Level Gain | |
| R16 | 1 Meg.Ohm - Average Level Gain | |
| R17 | 22K Ohms - Offset Adjustment | |
| R18 | 4.7K Ohms - Offset Adjustment | |
| R19 | 100K Ohms - Attack Time Adjustment | |
| R20 | 50K Ohms - Release Time Adjustment | |
| R21 | Pull-up on EOP/RST | |
| C1 | .33 μf - Coupling Capacitor | |
| C2 | .0068 μF - Anti-Aliasing Filter | fo = 6100 |
| C3 | .001 μf - Anti-Aliasing Filter | fo = 6100 |
| C4 | 22 μf - Coupling Capacitor | |
| C5 | .001 μf - Smoothing Filter | fo = 6100 |
| C6 | .0068 μf - Smoothing Filter | fo = 6100 |
| C7 | .01 μf - Average Level Low Pass | fo = 720 Hz |
| C8 | 100 pf - Average level Low Pass | fo = 720 Hz |
| C9 | 5 μf - Average Level Time Constant | |
| C10 | 10 pf - 2920 Clock Circuit | |
| C11 | 510 pf - Sample Capacitor | |
| C12 | .001 μf - Sample and Hold | |
| P1 | 10K Potentiometer - Offset Adjust. | |
| P2 | 1 Meg. Potentiometer - Attack Time Adjust. | |
| P3 | 1 Meg. Potentiometer Release Time Adjust. | |
| D1 | 1N914 G.P.Diode - Rectifier | |
| D2 | 1N914 G.P.Diode - Rectifier | |
| D3 | 1N914 G.P.Diode - Offset Biasing | |
| X1 | 6 MHz Crystal - 2920 Clock | |

We claim:

1. A hearing aid adapted to be worn by an individual of impaired hearing ability comprising a hearing aid microphone means for receiving audio signals including speech signals and any noise and for continuously converting the received audio signals to corresponding analog electrical signals; low pass filtering circuit means coupled to receive the analog signals from said microphone means for transmitting only those received analog signals falling within a preselected frequency band necessary for good fidelity and intelligibility of the audio signals and rejecting the signals of a frequency higher than the preselected frequency band; circuit means coupled to receive the signals from said low pass filtering circuit means and continuously deriving analog signals representative of the level of any noise present in the received audio signals; a wearable, programmable digital signal processing means having a memory and a plurality of signal input terminals and a signal output terminal, said signal processing means being capable of digitally processing the analog signals coupled thereto in real time and providing processed analog output signals therefrom; means for continuously coupling the signals from said low pass filtering circuit means to a first input terminal for said digital signal processing means; means for continuously coupling the signals from said circuit means providing the signals representative of the level of any noise in the received audio signals to a second input terminal for said digital signal processing means; means for providing an analog signal representative of a reference noise level for the received audio signals and coupling said reference signals to a third input terminal for said digital signal processing means, a signal processing program stored in the processor memory for continuous execution in the digital processor; said program being defined to continuously generate a plurality of adaptive digital filters for processing digital samples of the signals coupled to said first input terminal for said signal processing means to selectively modify the digital signals including suppressing the noise therein in accordance with changes in the levels of the noise in the samples of the signals coupled to the first input terminal of the signal processor, the program being further defined to continuously compare the signals coupled to the second and third input terminals for said signal processing means and adapting said digital filters for selectively modifying the signals including suppressing the noise therein coupled to said first input terminal based on the comparisons of the noise signals, the program providing continuous analog-to-digital signal conversion of the signals coupled to said first input terminal at a preselected sampling rate to permit each digital sample to be digitally filtered by said signal processor, the timing execution of the digital samples being defined to be sufficiently rapid to completely process each digital sample before the subsequent digital sample occurs, the signal processing means stored program including program steps to convert each of the filtered digital samples to corresponding analog signals appearing at said output terminal for the signal processing means; circuit means coupled to said signal processing means to smooth out said received analo signals for accurately reproducing the electrical signals representative of the intelligible speech signals, and hearing aid speaker means coupled to said circuit means for smoothing out the electrical signals for continuously converting the coupled signals to the corresponding signals having the improved characteristics in accordance with the execution of the stored program.

2. A hearing aid as adapted to be worn by an individual of impaired hearing ability as defined in claim 1 wherein said signal processor modifies the digital samples in accordance with the stored program, the signal processor executes a Fourier analysis on the digital samples, and said low pass filtering circuit means eliminates the frequency components of the analog signals introducing aliasing errors into the Fourier analysis of the digital samples at the digital sampling rate utilized to thereby permit proper digital processing of the analog signals within said digital signal processing means.

3. A hearing aid as adapted to be worn by an individual of impaired hearing ability as defined in claim 1 or 2 wherein said digital signal processing means is a microprocessor.

4. A hearing aid as adapted to be worn by an individual of impaired hearing aility as defined in claim 1 wherein said digital signal processing means comprises an Intel 2920 microprocessor.

5. A hearing aid adapted to be worn by an individual of impaired hearing ability comprising a hearing aid microphone means for receiving audio signals including any noise therein and converting the received audio signals to corresponding analog electrical signals; anti-aliasing filtering and preamplification circuit means coupled to receive the analog electrical signals from said microphone means, said filtering means being constructed and defined to cut off the received signals having a preselected high frequency and frequencies above said high frequency while continuously transmitting all signals therethrough below said high frequency and amplifying the filtered signals; programmable signal processing means having a plurality of signal input terminals and an output terminal, a first input terminal being coupled to continuously receive said amplified and filtered analog signals from said anti-aliasing filtering means, low pass filter circuit means coupled to continuously receive said amplified and filtered analog signals from said anti-aliasing filtering circuit means, said low pass filter means being constructed and defined to transmit all received signals below a preselected low frequency and to attenuate all received signals above said low frequency; circuit means coupled to said low pass filter means for receiving the signals transmitted through said filter means and providing signals having a voltage level representative of the level of any noise in the received signals; said signal processing means including a second input signal terminal coupled to receive the signals representative of the noise level content in the received signals, means for providing an analog signal representative of a reference noise level for the received audio signals and coupling said reference iignals to a third input terminal for said digital signal processing means; said signal processing means including a memory having a program stored therein to be executed for continuously digitally processing the analog signals continuously coupled to said first input terminal for said signal processing means in real time in accordance with the measurement of comparison of the signals coupled to said second and third input terminals for improving the signal-to-noise ratio of the signals coupled to said first input terminal for said signal processing means and continuously providing the processed signals as analog output signals from said output terminal for said signal processing means; smoothing filter circuit means coupled to said output terminal for said signal processing means for removing the effects of the digital processing on said analog output signals, and a hearing aid speaker and amplifying circuit means coupled to receive the analog signals from said smoothing filter circuit means and continuously providing corresponding audio signals having improved clarity of intelligibility of speech.

6. A hearing aid adapted to be worn by an individual of impaired hearing ability as defined in claim 5 wherein said antialiasing filtering circuit means is constructed and defined as a low pass electrical filter having a cut off frequency of approximately 6100 Hertz.

7. A hearing aid adapted to be worn by an individual of impaired hearing ability as defined in claim 5 or 6 wherein said low pass filter circuit means is constructed and defined to transmit analog signals below approximately 750 Hertz and to attenuate analog signals above 750 Hz.

8. A hearing aid adapted to be worn by an individual of impaired hearing ability as defined in claim 5 wherein said programmable signal processing means is a programmable microprocessor signal means.

9. A hearing aid adapted to be worn by an individual of impaired hearing ability as defined in claim 8 wherein said microprocessor signal means is an Intel 2920 microprocessor.

10. A hearing aid adapted to be worn by an individual of impaired hearing ability as defined in claim 5 wherein said stored program functions to convert the analog signals coupled to its input terminals to digital signals at a preselected sampling rate and to digitally filter the analog signals to improve the signal-to-noise ratio thereof in accordance with the detected noise level in the analog signal and to reconvert the digitally filtered signals to analog signals in real time.

11. A hearing aid adapted to be worn by an individual of impaired hearing ability as defined in claim 5 wherein said stored program functions to convert the analog signals coupled to said first input terminal to corresponding digital signals at a preselected sampling rate and to convert the analog signals coupled to said second input terminal to corresponding digital signals at said preselected sampling rate; said stored program functioning to continuously form a plurality of second order digital filters having varying digital signal filtering capabilities varying from no filtering to a high pass filter and functioning to select one of the digital filters based on the result of said measurement of the noise signals derived from the second and third input terminals and to direct the digital signals derived from the analog signals coupled to said first input terminal to the selected digital filter and then converting the digitally filtered signals to corresponding analog signals that are outputted from the signal processing means.

12. A hearing aid adapted to be worn by an individual of impaired hearing ability comprising a hearing aid microphone means for receiving audio signals including any noise therein and ocntinuously converting them to corresponding analog output electrical signals; anti-aliasing filtering circuit means coupled to receive the analog signals from said microphone means for transmitting only those analog signals low enough in frequency so as not to introduce errors in the digital processing of the analog signals; circuit means coupled to receive the signals from said anti-aliasing filtering circuit means and continuously deriving analog signals representative of level of any noise present in the received audio signals; a wearable, programmable digital signal processing means having a memory and a plurality of signal input terminals and a signal output terminal, said signal processing means being capable of digitally processing the analog signals coupled thereto in real time and providing processed analog output signals therefrom; means for continuously coupling the signals from said anti-aliasing filtering circuit means to a first input terminal for said digital signal processing means; means for continuously coupling the signals representative of any noise in the received audio signals from said circuit means to a second input terminal for said digital processing means; means for providing an analog signal representative of a reference noise level for the received audio signal and coupling said reference signals to a third input terminal for said digital signal processing means; a signal processing program stored in said memory for continuous execution in the digital processor, said program being defined to continuously convert the analog signals coupled to said first input terminal to digital signals representative thereof and to internally continuously compare the noise signals coupled to said second and third input terminals for determining the manner of processing the digital signals representative of the microphone output signals, the program, upon execution, being effective to suppress any noise in the signals undergoing processing in accordance with the noise comparisons and providing processed analog output signals representative of the micorphone output signals, and hearing aid speaker circuit means coupled to receive the processed analog output signals and continuously converting them to corresoponding audio signals of improved intelligibility.

13. A hearing aid adapted to be worn by an individual of impaired hearing ability as defined in claim 12 wherein said digital signal processing means is a microprocessor.

14. A digital signal processor for a hearing aid comprising a programmable digital signal processor having a memory for storing a program to be continuously executed, the digital signal processor having a plurality of input terminals and at least a single output terminal, said digital signal processor being capable of continuously digitally processing analog signals representative of continuous audio signals including speech and any noise therein to improve the signal-to-noise ratios thereof in real time and continuously provide the processed signals as analog output signals at the output terminal thereof; one of said input terminals is adapted to continuously receive analog signals representative of continuous audio signals; a second of said input terminals is adapted to continuously receive analog signals representative of the level of the noise in said continuous audio signals; a third of said input terminals is adapted to continuously receive precision oscillator signals of a preselected high frequency; a fourth of said input terminals is adapted to continuously receive analog signals represnntative of a reference noise level, said program to be continuously executed stored in said processor memory, said program upon execution causing (1) clock pulses to be generated at a preselected rate in response to the oscillator signals coupled to said third input terminal for digitally sampling the analog signals coupled to said one of the input terminals, (2) the analog signals coupled to the input terminals to be converted to corresponding digital signals; (3) the continuous generation of a plurality of second order digital filters adapted to improve the signal-to-nose ratio of the signals coupled to said first input terminal with increasing noise levels, (4) continuously comparing the signals received at said second and fourth terminals, (5) continuously selecting one of the digital filters in accordance with the result of the noise comparision, (6) continuously coupling the digital signals corresponding to the signals coupled to said first input terminal to the selected digital filter, (7) continuously converting the digitally filtered signals to corresponding analog signals and emitting the analog signals at said output terminal whereby the clarity of intelligibility of speech in the audio signals corresponding to the emitted analog signals is maximized as a result of hhe digital filtering.

15. A digital signal processor for a hearing aid as defined in claim 14 comprising a wearable microprocessor.

16. A digital signal processor for a hearing aid as defined in claim 15 wherein said microprocessor comprises an Intel 2920 microprocessor.

17. A digital signal processor for use with a hearing aid comprising a very high speed, programmable microprocessor permitting audio bandwidth digital filtering in real time, said microprocessor having a memory for storing a program to be continuously executed; said program stored in the memory to be continuously executed in response to analog signals corresponding to the audio signals including any noise received by a hearing aid, the program being defined to continuously generate (1) digital signals corresponding to the analog signals coupled thereto at a preselected sampling rate, (2) a plurality of digital filters for selectively modifying each of the generated digital signals in an individual manner including improving the signal-to-noise ratios with increasing signal noise levels, the individual digital filters being selected in accordance with the detected noise levels, and (3) analog signals from the digital signals subjected to the digital filtering whereby the analog signals result in corresponding audio signals of improved audibility.

18. A digital signal processor for use with a hearing aid as defined in claim 17 wherein said microprocessor comprises an Intel 2920.

19. A method of improving the hearing ability of an individual with impaired hearing capability including the steps of receiving audio signals having any noise therein by an ear worn hearing aid and converting them to corresponding analog output signals; providing analog signals representative of the noise levels in said audio signals; coupling the analog output signals and the noise level analog signals to a programmable digital signal processing device, the digital signal processor having a program stored therein to continuously digitally process the analog signals coupled thereto to selectively modify said audio signals including suppressing any noise therein in accordance with the noise levels in said audio signals for improving the ability of an individual to hear the signals and providing corresponding analog output signals therefrom, the program is executed in real time; converting the analog output signals from the digital signal processing device to corresponding more intelligible audio signals in the hearing aid, and coupling the audio signals by means of said hearing aid to the ear of the hearing aid wearer.

20. A method of improving the hearing ability of an individual of impaired hearing ability by means of a hearing aid, the steps including positioning a hearing aid in and/or adjacent the ear canal of an individual having impaired hearing ability for receiving audible sound and continuously converting the audible sound to corresponding electrical analog signals; continuously filtering the resulting analog signals for limiting the frequency band of the received signals for preventing aliasing upon the digital filtering of the digital signals corresponding to the resulting analog singals, continuously deriving an analog signal representative of the noise level present in the received audible sound from the corresponding analog signal; positioning a wearable, programmable, digital signal processor on said individual of impaired hearing ability, the signal processor having a prbgram stored therein for improving the signal-to-noise ratio of the received audible signals, the stored program including the necessary sequence of instructions that are continuously executed by the processor in real time for converting the analog signals coupled thereto to corresponding preselected digital samples thereof and continuously generating a pluraltty of second order digital filters for reducing the noise content of the received signals, and continuously converting the digitally filtered signals to corresponding analog signals; continuously coupling the analog signals representative of the noise level of the received analog signals to said digital signal processor; continuously measuring the signals representative of the noise levels of the audible signals and continuously selecting the digital filter to be utilized in accordance with the result of the noise level signal measurements; continuously coupling the filtered analog signals to said digital signal processor; and continuously receiving the analog signals corresponding to the digitally filtered signals from the digital signal processor at said hearing aid; continuously converting the analog signals to corresponding audible sound signals and continuously coupling the sound signals to said individual's ear.

21. A method of improving the signal-to-noise ratio of audible sounds in real time including the steps of receiving audible signals including any noise at adjacent a human ear of an individual with impaired hearing ability and converting the signals to corresponding electrical analog signals; filtering the resulting analog signal to limit the frequency aand thereof to a preselected frequency band for preventing aliasing in any digital filtering of the resulting filtered signals; continuossly converting said filtered analog signals to digital signals occurring at a preselected rate; continuously deriving analog signals from the filtered analog signals representative of the noise level content of the received audible signals; continuously providing a plurality of second order digital filters for filtering the digital signals in real time, the digital filters each providing different filtering capabilities ranging from no filtering to a high pass filter with a roll off below a preselected noise frequency and some enhancement frequencies above a preselected frequency for continuously improving the signal-oo-noise ratios of the received signals; continuously converting the digital signals from the digital filters to corresponding analog output signals, continuously and automatically selecting one of the digital filters for coupling the digital signals thereto in accordance with the result of said comparison of the noise level signals, and continuously reconverting the electrical analog signals to audible signals whereby the audible signals have iproved signal-to-noise ratios, and coupling the audible signals into the ear of said invdividual to thereby increase the individual's hearing capability.

22. A method of improving the hering ability of an individual having impaired hearing capability by means of a hearing aid, the steps including continuously band limiting the analog signals having any noise therein provided by the hearing aid corresponding to audio signals continuously received at the hearing aid; continuously generating analog signals representative of the noise levles of the audio signals continuously received at the hearing aid; providing a high speed, digital signal processor capable of executing digital filtering of signals coupled thereto in real time, the signal processor having a memory for storing a computer program to be continuously executed by the signal processor; storing a computer program in the memory of the digital iignal processor, the computer program being characterized as including the sequence of instructions to be executed within said processor for continuously (1) converting the band limited analog signals to corresponding digital signals occurring at a preselected rate, (2) generating a plurality of digital filters with each filter having an individual filtering characteristic for improving the audibility of the audio output signal of the hearing aid, (3) selecting an individual filter for filtering the digital signals based on the measurement of the generated noise level signals, (4) digitally filtering the digital signals at the preselected digital filter for selectively modifying the signals including suppressing the noise therein, (5) converting the filtered digital signals to corresponding output analog signals from the signal processor, the processing of the individual digital signals being completed before a subsequent digital signal occurs with all digital signals being processed with very little time delay; the digital processing of the band limited analog signals being effective for improving the signal-to-noise ratios of the audio signals received at the hearing aid from the signal processor, and continuously coupling the band limited analog signals to the digital signal processor; continuously coupling the noise level signals to the digital signal processor, and continuously coupling the output analog signals to the hearing aid.

* * * * *

UNITED STATES PATENT AND TRADEMARK OFFICE
CERTIFICATE OF CORRECTION

PATENT NO. : 4,791,672

DATED : December 13, 1988

INVENTOR(S) : James A. Nunley et al

It is certified that error appears in the above-identified patent and that said Letters Patent is hereby corrected as shown below:

Column 1, line 34, change "changed" to -- change --.
line 59, change "knowledg" to -- knowledge --.
Column 4, line 47, change "provided" to -- provide --.
Column 5, line 9, after "16", insert -- is --.
line 28, change "whihc" to -- which --.
Column 6, line 19, change "amllifier" to -- amplifier --.
Column 7, line 8, delete "R13." (second occurrence).
line 21, change "ampiifier" to -- amplifier --.
line 29, change "hhe" to -- the --.
Column 8, line 34, change "hhe" to -- the --.
line 55, change "U3" to -- U-3 --.
line 66, change "sinnals" to -- signals --.
Column 9, line 3, change "cyrstal" to -- crystal --.
line 12, delete "terminal" (second occurrence).
line 52, change "accordane" to --accordance --.
Column 11, line 7, change "compressron" to -- compression --.
line 17, change "characteristiss" to -- characteristics--.
Column 13, line 22, change "analo" to -- analog --.
Column 14, line 13, change "iignals" to -- signals --.
line 19, after "the" (first occurrence), delete "measurement of".

UNITED STATES PATENT AND TRADEMARK OFFICE
CERTIFICATE OF CORRECTION

PATENT NO. : 4,791,672

DATED : December 13, 1988

INVENTOR(S) : James A. Nunley et al

It is certified that error appears in the above-identified patent and that said Letters Patent is hereby corrected as shown below:

Column 15, line 16, change "ocntinuously" to -- continuously --.
line 40, change "signal" to -- signals --.
Column 16, line 15, change "represnntative" to -- representative --.
line 39, change "hhe" to -- the --.
Column 17, line 38, change "prbgram" to -- program --.
line 64, delete "at".
Column 18, line 1, "aand" should be -- band --.
line 4, "tinuoussly" should be -- tinuously --.
line 15, "signal-oo-noise" should be -- signal-to-noise--.
line 23, "iproved" should be -- improved --.
line 26, change "hering" to -- hearing --.
line 34, change "levles" to -- levels --.
line 40, change "iignal" to -- signal --.

Signed and Sealed this

Twenty-seventh Day of June, 1989

*Attest:*

DONALD J. QUIGG

*Attesting Officer*

*Commissioner of Patents and Trademarks*